(No Model.)
W. C. LEECHMAN.
OIL OR SIMILAR PRESS.
No. 461,129. Patented Oct. 13, 1891.
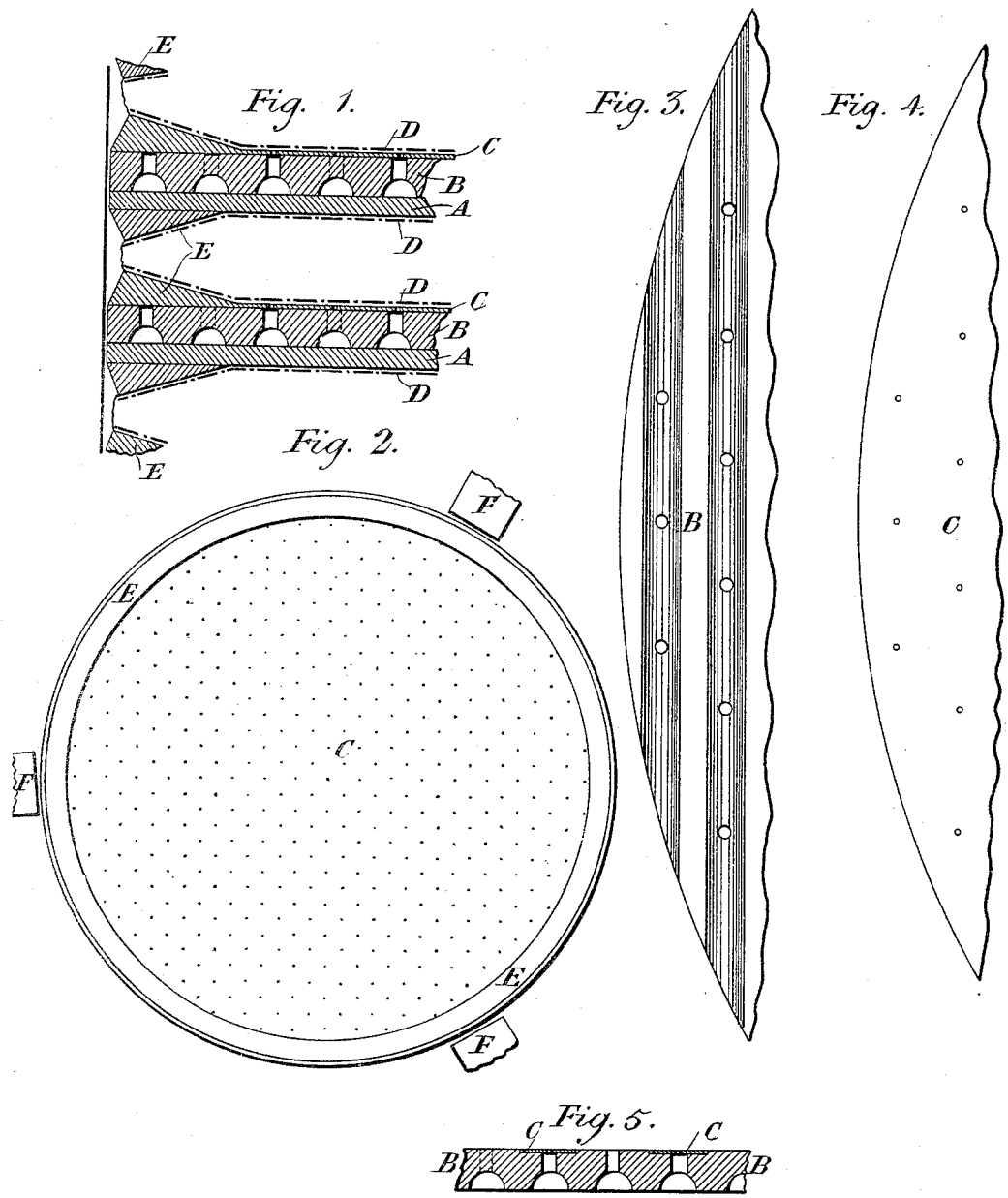

UNITED STATES PATENT OFFICE.

WILLIAM CAREY LEECHMAN, OF COLOMBO, CEYLON.

OIL OR SIMILAR PRESS.

SPECIFICATION forming part of Letters Patent No. 461,129, dated October 13, 1891.

Application filed October 20, 1890. Serial No. 368,686. (No model.)

*To all whom it may concern:*

Be it known that I, WILLIAM CAREY LEECHMAN, merchant, a subject of the Queen of Great Britain, residing at Colombo, in the Island of Ceylon, have invented a certain new and useful Oil or Similar Press, of which the following is a specification.

This invention relates to that class of presses in which the solid material to be pressed is placed between plates, which are then forced toward each other, the liquid expressed escaping at the outer surface of the material.

Attempts hitherto made to introduce drainage on the surface of the press-plates have met with little success, especially when high pressures have been used, owing to the clogging of the presses and the damage to the cloths. The object of my invention is to obviate these objections.

To facilitate free discharge of the liquid, I introduce an extra plate grooved on one surface, with holes leading from the grooves to the ungrooved surface, which is covered with a cloth. This arrangement acts well for moderate pressures of, say, half a ton to the square inch; but when high pressures are employed the smallest holes which can conveniently be made in a comparatively thick plate are too large for the purpose, and clogging and damage to the cloth results. To overcome this, I throttle the orifices of the holes by applying on the side next the cloth a thin covering-plate with similarly arranged but much finer perforations. I employ rings with inclined surfaces around the plates to prevent the material being pressed from escaping from between the plates.

Figure 1 is a vertical section of a part of a press fitted with plates made according to my invention. Fig. 2 is a horizontal section, on a smaller scale, of the press with the top cloth removed. Fig. 3 is an under side view of part of one of the grooved and perforated plates, and Fig. 4 is a plan of part of one of the finely-perforated upper plates. Fig. 5 is a vertical section of a modified plate.

A A are the plain press-plates as now commonly used.

B B are grooved and perforated plates.

C C are finely-perforated plates, which lie on the top of the plates B.

D D are cloths, which are placed on the plates C and also above the material to be pressed.

E E are rings with an inclined surface, which may either be loose or be fixed to the plates B, and preferably also to the plates A, which serve to prevent the material being pressed from spreading outward.

F F are the guides of the press.

In Fig. 5 a separate plate C, having a central perforation, is placed in a recess above each of the holes in the plate B; but in most cases the arrangement shown in Fig. 1 is preferable.

The details of the press are not shown in the drawings, as those are old and well understood.

In place of the face of the plate A, next to the plate B, being plain, it may be grooved or channeled, in which case the grooves or channels in the face of the plate B may be omitted.

I would state that I am aware that a grooved and perforated plate covered on one side with cloth has before been proposed, and I therefore make no claim to such an arrangement; but

What I claim is—

1. In oil and similar presses, the combination, substantially as set forth, of a plate having perforations in one face opening into grooves in the other face, a thin flat plate with corresponding but finer perforations arranged on the perforated sides of the first-mentioned plate and in contact therewith, a cloth covering said last-mentioned perforated plate, and an imperforate plate covering the grooves in the first-mentioned plate.

2. In oil and similar presses, the combination of a plate B, having perforations in one face opening into grooves in the other face, the plate C, with corresponding but finer perforations, arranged on the perforated side of the plate B, and in contact therewith an imperforate plate A, arranged on the grooved side of the plate B, and cloths arranged over the surfaces of the plates C and A.

3. In oil and similar presses, the combination of an imperforate plate A, a plate B, with perforations in one face opening into grooves in the other face, a cloth covering the perforations in said plate, and a ring with an inclined inner surface surrounding the plates for confining the material between the plates.

Colombo, September 16, 1890.

WILLIAM CAREY LEECHMAN.

Witnesses:
G. LEECHMAN TAYLOR,
GEO. BARCLAY LEECHMAN,
*Merchants, Colombo.*